United States Patent [19]

Hartmann et al.

[11] Patent Number: 4,912,617
[45] Date of Patent: Mar. 27, 1990

[54] SWITCH MODE POWER SUPPLY WITH SEPARATELY REGULATED SECONDARY VOLTAGE

[75] Inventors: Uwe Hartmann; Udo Mai, both of Untergriesbach, Fed. Rep. of Germany

[73] Assignee: Deutsche Thomson-Brandt GmbH, Fed. Rep. of Germany

[21] Appl. No.: 246,481

[22] Filed: Sep. 19, 1988

[30] Foreign Application Priority Data

Sep. 19, 1987 [DE] Fed. Rep. of Germany ....... 3731644

[51] Int. Cl.$^4$ .......................................... H02M 3/335
[52] U.S. Cl. ..................................... 363/21; 323/235; 363/67
[58] Field of Search ............................. 363/21, 67, 85; 315/411; 323/235

[56] References Cited

U.S. PATENT DOCUMENTS

| 3,491,283 | 1/1970 | Johnston | 363/85 |
| 4,313,061 | 1/1982 | Thomas | 323/319 |

FOREIGN PATENT DOCUMENTS

| 0096300 | 12/1983 | European Pat. Off. | |
| 3518675 | 11/1986 | Fed. Rep. of Germany | |
| 2542522 | 9/1984 | France | 363/21 |
| 56-76577 | 11/1982 | Japan | |

OTHER PUBLICATIONS

Mattson et al., "High-Frequency Power Supply", IBM Tech. Discl. Bul., vol. 15, No. 10, pp. 3175, 3176, Mar. 1973.
IBM Tech. Disclosure Bul., vol. 15, No. 1, Jun. 1972, pp. 70–71.
57-193820A, Patent Abstracts of Japan, Band 7, No. 42, Feb. 19, 1983.
IBM Tech. Disclosure Bul., vol. 21, No. 12, May 1979, pp. 4909–4910.

Primary Examiner—William H. Beha, Jr.
Attorney, Agent, or Firm—Joseph S. Tripoli; Joseph J. Laks; Harvey D. Fried

[57] ABSTRACT

A primary winding of a transformer is coupled to a source of input voltage and to a controllable switch. The switch is responsive to a first control signal for generating output pulses in the transformer secondary windings. A supply circuit is responsive to the output pusles and generates a first supply voltage. A capacitor charging circuit includes a thyristor that is coupled to one of the transformer secondary windings. The thyristor receives the output pulses for providing charging pulses to the capacitor for generating a second supply voltage. A control circuit is coupled to the thyristor for varying the number of output pulses occurring relative to a given number of charging pulses to regulate the second supply voltage.

26 Claims, 2 Drawing Sheets

SWITCH MODE POWER SUPPLY WITH SEPARATELY REGULATED SECONDARY VOLTAGE

This invention relates to a controlled switch mode power supply.

BACKGROUND

In electronic equipment, such as television receivers or other consumer products, switch mode power supplies may be economically used. These switch mode power supplies provide control or regulation of, for example, a relatively high level operating voltage, such as the B+ scan supply voltage for the line output stage of a television receiver. The regulation is performed on the secondary side of the switch mode power supply transformer by comparing an operating voltage level with a nominal value. The result of the comparison is transferred to the primary side of the switch mode power supply to control a pulse width modulator or other control circuit which supplies trigger pulses to the electronic switch of the switch mode power supply.

Because only the B+ operating voltage is directly sensed and controlled, other operating voltages generated by the switch mode power supply, such as lower potential operating voltages, may require further regulation. These voltages may require further regulation because they may be loaded differently and because their associated loads may require tighter voltage regulation.

To achieve further regulation, it is known to use linearly operated regulators which are expensive and lossy. A feature of the invention is the stabilization or regulation of the lower potential operating voltages in a manner that provides for reduced power dissipation in the regulator.

SUMMARY OF THE INVENTION

In a switch mode power supply, an inductance is coupled to a source of input voltage and to a controllable switch. The controllable switch is responsive to a first control signal for generating output pulses in the inductance. A charging circuit is coupled to the inductance and to a capacitance and is responsive to the output pulses for supplying charging pulses to the capacitance to generate a supply voltage. A control circuit, responsive to a control signal, is coupled to the charging circuit for varying the number of output pulse periods occurring relative to a given number of output pulse periods.

DETAILED DESCRIPTION OF THE INVENTION

Figure 1:
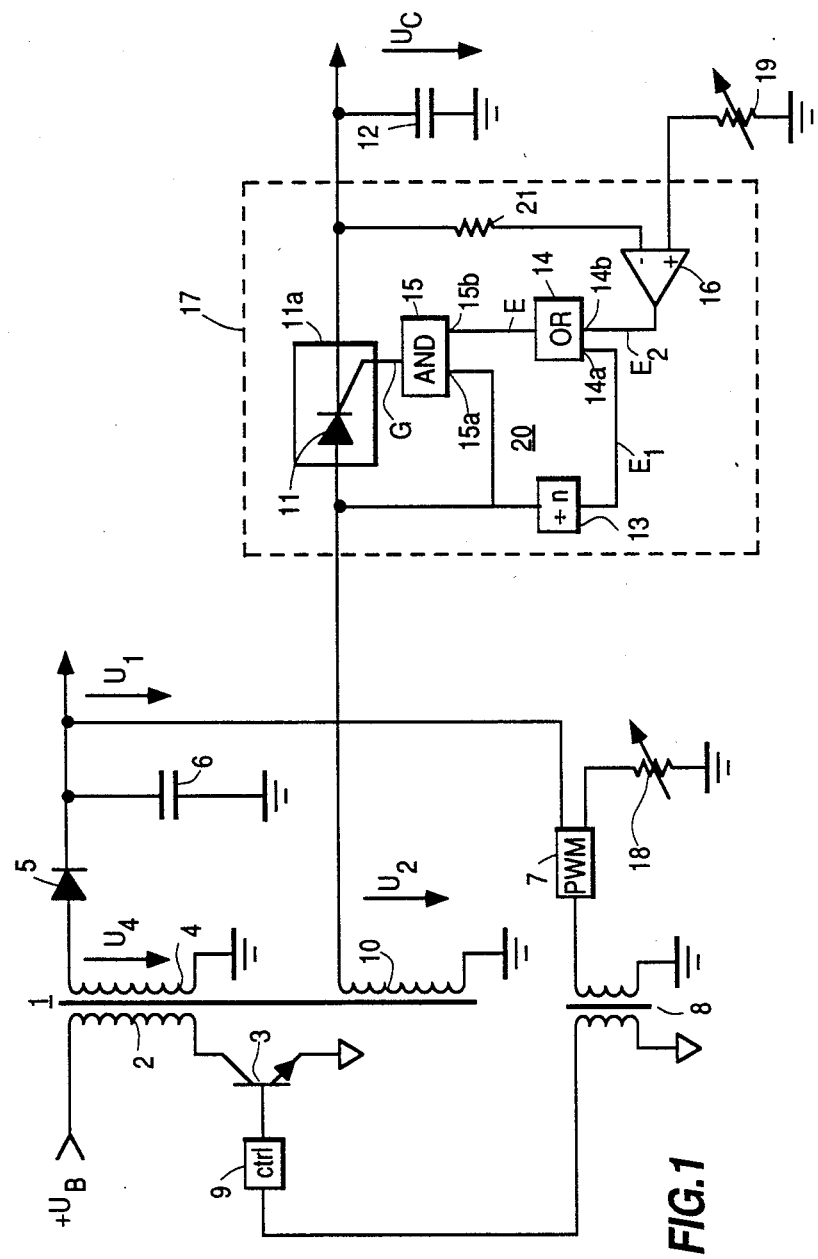
FIG. 1 illustrates a switch mode power supply embodying the invention.

In the switch mode power supply of FIG. 1, a primary winding 2 of a switch mode power supply transformer 1 is coupled at one end terminal to an unregulated, mains rectified DC operating voltage $U_B$, and is coupled at the other end terminal to an electrically nonisolated ground via an electronic switch, transistor 3.

A secondary winding 4 of transformer 1, electrically isolated from the mains supply, has a first end terminal coupled to a mains isolated ground and the other end terminal coupled to the anode of a rectifier 5. The cathode of rectifier 5 is coupled to a filter capacitor 6.

In operation, a control circuit 9 periodically switches transistor 3 between conductive states to generate output pulses in primary winding 2, secondary winding 4 and a mains isolated secondary winding 10. The AC output pulse voltage $U_2$ developed across secondary winding 10 is shown in idealized form in FIG. 2a. For explanatory purposes it may be assumed that the AC voltages developed across the other two windings, although differing in amplitude, are similar in waveshape. Thus the waveform of FIG. 2a also illustrates the voltage $U_4$ developed across secondary winding 4.

Circuit-wise, rectifier 5 is poled to become conductive when transistor 3 becomes nonconductive, in a flyback converter mode of operation. Thus, when transistor 3 is conductive and stores energy in the magnetics of transformer 1, the lower voltage $V_L$ of FIG. 2a is being generated, and rectifier 5 is nonconductive. When transistor 3 is made nonconductive, and the stored energy is transferred via the secondary windings, the upper voltage level $V_H$ is generated, causing rectifier 5 to become forward biased and charge filter capacitor 6.

Filter capacitor 6 charges during the off-time of transistor 3 to a voltage level that then reverse biases the rectifier. After rectifier 5 becomes reverse biased, the midlevel voltage $V_M$ of the AC voltage waveform in FIG. 2a is generated for the remaining portion of the off-time of transistor 3. When voltage level $V_M$ is being generated, both transistor 3 and rectifier 5 are nonconductive. In this way, a DC supply voltage $U_1$ is generated across filter capacitor 6.

Supply voltage $U_1$ may be a relatively high operating level voltage, suitable for use as the B+ scan supply for a line scanning circuit. To maintain the level of voltage $U_1$ well-regulated, the voltage is directly sensed in a comparator stage, not illustrated in FIG. 1, of a pulse width modulator 7. In the comparator stage of modulator 7, the level of voltage $U_1$ is compared against a nominal preset value established by a variable resistor 18, to vary the pulse width modulated signal generated by the modulator. The output of modulator 7 is transformer coupled via a mains isolation transformer 8 to a control circuit 9 of transistor 3. Control circuit 9 varies the on-time width of the switching pulses supplied to the base of transistor 3. The resulting pulse width modulation of the switching of transistor 3 produces a pulse width modulation of the AC voltage of FIG. 2a that maintains constant upper voltage level $V_H$, thereby regulating supply voltage $U_1$.

In accordance with an aspect of the invention, a controllable supply stage 17 is interposed between secondary winding 10 and a capacitor 12 for supplying charging pulses to the capacitor from secondary winding 10 to generate a regulated DC supply voltage $U_C$, of e.g. +5V.

Regulating supply stage 17 includes a controllable switching stage 11a which is periodically made conductive by control pulses generated in a control circuit 20. The periodic conduction of switching stage 11a generates charging pulses in synchronism with the generation of AC pulses $U_2$. The charging pulses maintain capacitor 12 at a DC level of supply voltage $U_C$ that is well-regulated.

Switching stage 11a advantageously includes a silicon controlled rectifier or thyristor 11 that has a main current path that is defined by the thyristor anode and cathode terminals and that is interposed between winding 10 and capacitor 12 without an intervening rectifier and DC filter stage. The anode terminal of the thyristor is coupled to the terminal of winding 10 that is remote from ground and the cathode terminal is coupled to capacitor 12. The gate or control terminal of thyristor 11 is coupled to the output of control circuit 20.

Control circuit 20 periodically provides gating pulses G to gate thyristor 11 into conduction in synchronism with the switching of transistor 3 and in synchronism with the generation of output voltage pulses $U_2$. The charging pulses produce the sharp, upwardly ramping voltage segments CP1–CP8 of voltage $U_C$ illustrated in FIG. 2b. Between occurrences of the charging pulses, capacitor 12 is discharged by the load circuits, not illustrated in FIG. 1, that are coupled to the capacitor. The discharge of capacitor 12 produces the more shallow, downwardly ramping sections, DR1–DR8, of voltage $U_C$.

In accordance with a feature of the invention, control circuit 20 establishes the number of output pulse periods occurring relative to a given number of charging pulse periods. For example, under very light loading conditions, capacitor 12 will be slowly discharged in accordance with discharging ramp segment DR1. The period $t_0$–$t_1$ between charging segments CP1 and CP2 is such as to provide one charging pulse for every four pulses, P1–P4, of AC voltage $U_2$. In contrast, under heavier loading conditions, associated with, for example, discharging ramp DR2, the period $t_1$–$t_2$ between charging pulse segments CP2 and CP3 is such as to generate one charging pulse for every two pulses, P5 and P6, of AC voltage $U_2$. Under very heavy loading conditions that produce a sharply discharging ramp DR3, the period $t_2$–$t_3$ between charging pulse segments CP3 and CP4 is such as to generate one charging pulse for each pulse of AC voltage $U_2$.

The ratio of the number of periods of output pulses $U_2$ relative to a given number of periods of charging pulses is established by control circuit 20 and may, for example, be established as a ratio of two positive integers such as a ratio of 4 to 1. This ratio may then be varied for regulation purposes in a manner that still maintains the ratio as a ratio of two positive integers.

Control circuit 20 includes a gating circuit 15 which passes triggering pulses to thyristor 11. The triggering pulses are developed at an input terminal 15a when gating circuit 15 is enabled by an enabling signal E coupled to an enabling input terminal 15b. From the point of view of control circuit logic, gating circuit 15 is configured as an AND gate.

In accordance with an inventive feature, the triggering pulses that are coupled to input terminal 15a are the AC voltage pulses $U_2$ of FIG. 2a that are generated in secondary winding 10. AND gate 15 recognizes the upper voltage level $V_H$ of voltage $U_2$ as a logical 1 state and the other voltage levels $V_M$ and $V_L$ as a logical 0 state.

Enabling input terminal 15b is coupled to the output of an enabling control stage 14 that is configured in terms of circuit logic as an OR gate. A first OR gate input terminal, terminal 14a, is coupled to the output of a frequency divider 13. Divider 13 that has a dividing factor n, where n is a positive number. In particular, n may be selected as a positive integer greater than 1. In the example illustrated in FIGS. 2a and 2b, n is the positive integer 4.

Frequency divider 13 is operated synchronously with the generation of AC output voltage pulses $U_2$. Output voltage pulses $U_2$ are coupled to the input of frequency divider 13 to generate a signal E1 having a frequency 1/n times that of voltage pulses $U_2$. Enabling signal E1 switches to its logical 1 state in coincidence with the leading, positive going edge of voltage $U_2$, when voltage $U_2$ switches from the lower voltage level $V_L$ to the upper voltage level $V_H$, i.e. when transistor 3 switches from being conductive to being nonconductive.

The output of a comparator 16 is coupled to terminal 14b, the other input terminal of OR gate 14. Supply voltage $U_C$ is coupled to the inverting input terminal of comparator 16 via an impedance 21. Comparator 16 compares the level of voltage $U_C$ against a nominal level S illustrated in FIG. 2b, which level may be preset by coupling an adjustable resistor 19 to the noninverting input terminal of the comparator.

An enabling signal E2 is developed at the output of comparator 16 and is applied to input terminal 14b of OR gate 14. Enabling signal E2 assumes the logical 0 state when the level of voltage $U_C$ is above threshold level S and assumes a logical 1 state when below.

Consider the operation of control circuit 20 and thyristor 11 under a condition of very light loading of supply voltage $U_C$. Such a light loading condition may occur during standby operation of the television receiver when some of the load circuits coupled to supply voltage $U_C$ are inactive.

Figure 2:
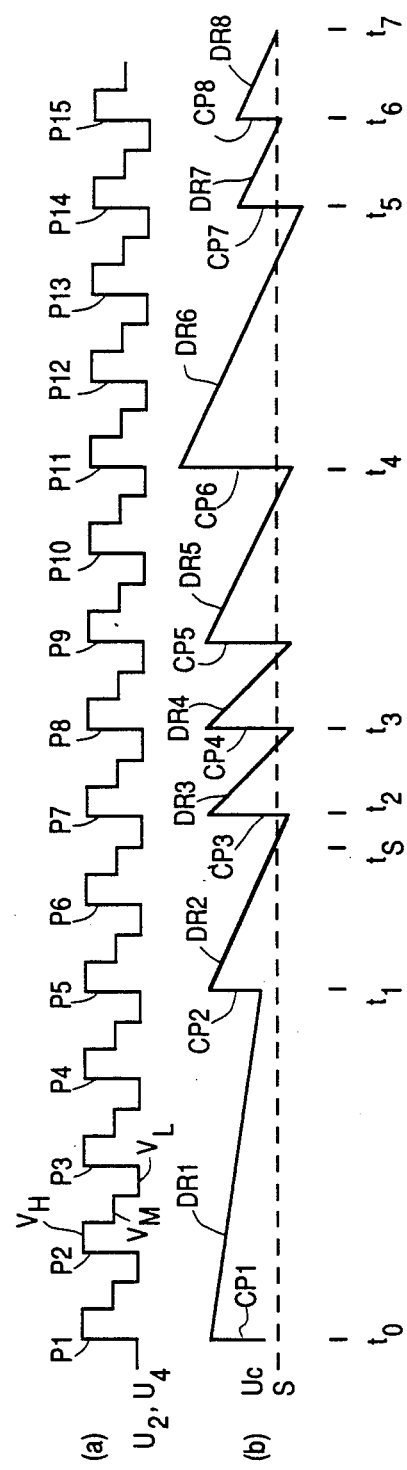
FIG. 2 illustrates waveforms useful in explaining the operation of the power supply of FIG. 1.

Assume such a loading condition exists at time $t_0$ of FIG. 2. At time $t_0$, control circuit 20 generates a gating pulse G that gates thyristor 11 into conduction. Capacitor 12 rapidly recharges to a voltage level substantially that of level $V_H$ of voltage $U_2$, as illustrated by the sharp, upwardly ramping section CP1 of voltage $U_C$. Upon completion of the charging pulse, thyristor 11 becomes blocked, anode-to-cathode, and disconnects voltage $U_2$ from capacitor 12. Capacitor 12 then begins a slow discharge due to the light loading.

Assume a dividing factor n=4. After elapse of four pulse periods of voltage $U_2$ from time $t_0$, frequency divider 13 generates the logical 1 state of enabling signal E1 at time $t_1$, a time that is coincident with the leading, positive going edge of the next pulse P5 of voltage $U_2$.

The logical 1 state of enabling signal E1 is passed through OR gate 14 to generate the logical 1 state of enabling signal E at enabling input terminal 15b of AND gate 15. With AND gate 15 enabled at time $t_1$, the concurrently occuring pulse P5 of voltage $U_2$ is passed through AND gate 15 to generate a gating pulse G for gating thyristor 11 into conduction at time $t_1$. Capacitor 12 then recharges from voltage $U_2$ to replenish losses sustained during the interval $t_0$–$t_1$.

Under the just described relatively light loading condition, control circuit 20 generates a gating pulse for thyristor 11 before voltage $U_C$ decreases below comparator threshold level S. Thus, control circuit 20 advantageously operates independently of the output voltage feedback provided by comparator 16.

Consider now a situation where supply voltage $U_C$ is more heavily loaded, such as during the interval $t_1$–$t_2$. Under the heavier loading condition, capacitor 12 is discharged faster. The downwardly ramping section DR2 of voltage $U_C$ decreases faster so as to cross threshold level S at time $t_S$, well before divider 13 generates the logical 1 state of enabling signal E1. At time $t_S$, comparator 16 switches the other enabling signal, signal E2, to the logical 1 state, which state is passed through by OR gate 14 as the logical 1 state of enabling signal E. AND gate 15 is then conditioned for passing through to the gate of thyristor 11 the next pulse P7 of voltage $U_2$ at the later time $t_2$. At time $t_2$, thyristor 11 is made conductive by gating pulse G to generate a charging pulse for capacitor 12 that recharges the capacitor. Gating pulse G is also coupled to divider 13 via a rest line not illustrated in FIG. 1 to reset the divider at time $t_2$ to avoid erroneous subsequent triggering of thyristor 11 by the output of the divider.

Under the heavier loading condition just described, the feedback of voltage $U_C$ is effective to shorten the number of pulse periods of AC voltage $U_2$ that must occur before the next charging pulse is generated. For the situation just described, only two pulse periods of voltage $U_2$ elapse between successive charging pulse segments CP2 and CP3.

Standard logic building blocks such as gates and flip-flops may be used in circuit 20 to ensure that an integral number of pulses $U_2$ occur between successive capacitor charging pulses, even when voltage $U_C$ crosses threshold level S at a point intermediate the leading edges of two successive $U_2$ pulses.

Because thyristor 11 is made conductive by control circuit 20 during the occurrence of the upper voltage level $V_H$ of AC output voltage $U_2$, capacitor 12 is being charged from a voltage source that is already regulated by the switching of transistor 3. A simple control circuit 20 may then be used in conjunction with a thyristor switch in regulating supply stage 17. No complicated pulse width modulating circuitry need be used. Rather, simple pulse counting circuitry may be used which varies the number of capacitor charging pulses that occur for a given number of output voltage pulses $U_2$. This greatly facilitates the fabrication of substantially all of regulating supply stage 17 onto a single integrated circuit that includes thyristor 11, comparator 16 and control circuit 20.

Pulse width modulating transistor 3 is under the direct feedback control of supply voltage U1 to directly regulate AC voltage $U_4$, developed in secondary winding 6. Under certain circumstances, such as under substantial AC mains voltage variations, AC voltage $U_2$, developed in secondary winding 10, may vary despite the fact that AC voltage $U_4$ is well regulated.

Advantageously, regulating supply stage 17 is capable of compensating for the variations that may occur in voltage $U_2$. If voltage $U_2$ increases in voltage level $V_H$ at time $t_4$, for example, comparator threshold level S will be crossed at a later time $t_5$. The interval $t_4$-$t_6$ between capacitor charging pulses will lengthen, and the capacitor will be recharged after 3 pulses, P11-P13, have been generated. If voltage $U_2$ decreases in voltage level $V_H$, at time $t_6$, for example, comparator threshold level S will be crossed at an earlier time $t_7$ and capacitor 12 will be recharged during each pulse period of voltage $U_2$. It should be noted that for the sake of simplification, the waveform voltage train of FIG. 2a is shown without pulse width modulation or amplitude variation.

It may be desirable to choose the dividing factor n of frequency divider 13 such that the divided frequency is above the limit of audibility. Thus under very light loading conditions, when thyristor 11 is being switched at its lowest frequency, no disturbing audible vibrations will be generated. At a switching frequency of 64 kilohertz for switching generator 3, one may select n=4, to provide a switching frequency for thyristor 11 of 16 kilohertz or greater.

What is claimed is:

1. A switch mode power supply, comprising:
   a source of input voltage;
   an inductance coupled to said source;
   a controllable switch coupled to said inductance and responsive to a first control signal that controls switching of said controllable switch for generating output pulses in said inductance;
   a capacitance;
   charging means coupled to said inductance and to said capacitance for supplying said output pulses as charging pulses to said capacitance to generate a supply voltage;
   control means coupled to said charging means and responsive to a second control signal related to said supply voltage, for selectively gating the second of any two successive output pulses as a charging pulse whenever said supply voltage is below a threshold value between leading edges of said any two successive output pulses to control said supply voltage; and,
   a ratio of the number of output pulses to said given number of charging pulses is a ratio of two positive integers.

2. A power supply according to claim 1 wherein said charging means includes a second switch coupled to said capacitance and having said output pulses applied to a main terminal thereof for gating said charging pulses in accordance with a periodic switching of said second switch by said control means.

3. A power supply according to claim 2, wherein said second switch comprises a thyristor that is made nonconductive by anode-to-cathode blockage.

4. A power supply according to claim 2, wherein said control means includes means responsive to said second control signal for generating a switching control signal to produce said periodic switching of said second switch and further comprising a comparator for comparing said supply voltage against a nominal voltage level to generate said second control signal for varying said periodic switching.

5. A power supply according to claim 4, wherein said second switch comprises a thyristor that is made nonconductive by anode-to-cathode blockage.

6. A power supply according to claim 2, including a supply circuit responsive to said output pulses for generating another supply voltage and wherein said inductance comprises a transformer having a first winding coupled to said controllable switch, a second winding coupled to said supply circuit and a third winding coupled to said second switch without intervening rectification and filtering of the voltage developed in said third winding.

7. A power supply according to claim 6, wherein said supply circuit includes a rectifier coupled to said second winding, said rectifier and second switch being made conductive when said controllable switch becomes nonconductive.

8. A switch mode power supply, comprising:
   a source of input voltage;
   an inductance coupled to said source;
   a controllable switch coupled to said inductance and responsive to a first control signal that controls switching of said controllable switch for generating output pulses in said inductance.;
   a capacitance;

charging means coupled to said inductance and to said capacitance for supplying said output pulses as charging pulses to said capacitance to generate a supply voltage; and, control means coupled to said charging means and responsive to a second control signal related to said supply voltage, for selectively gating the second of any two successive output pulses as a charging pulse whenever said supply voltage is below a threshold value between leading edges of said any two successive output pulses to control said supply voltage, said control means including a frequency divider operated synchronously with said output pulses for generating a charging pulse for every n output pulses, where n is a positive number.

9. A power supply according to claim 8, wherein the value of n is selected to provide a charging pulse frequency above the audible range.

10. A power supply according to claim 8, wherein said frequency divider has a dividing factor of n.

11. A power supply according to claim 10, wherein n is a positive integer greater than one.

12. A power supply according to claim 1, further comprising a comparator for comparing said supply voltage against a nominal preset value to generate said second control signal in accordance with a comparator value.

13. A power supply according to claim 1, further comprising a supply circuit responsive to said output pulses for generating another supply voltage.

14. A power supply according to claim 12, further comprising means responsive to said another supply voltage for generating said first control signal in a manner that varies with variations of said another supply voltage to concurrently vary the switching of said controllable switch.

15. A power supply according to claim 1, wherein a change in said second control signal produces a concurrent change in the first mentioned ratio in a manner that maintains said first mentioned ratio a ratio of two positive integers.

16. A power supply according to claim 15, wherein said second control signal is representative of variations in said supply voltage, thereby producing regulation thereof.

17. A switch mode power supply, comprising:
a source of input voltage;
an inductance coupled to said source;
a controllable switch coupled to said inductance and responsive to a first control signal that controls switching of said controllable switch for generating output pulses in said inductance;
a capacitance;
charging means coupled to said inductance and to said capacitance for supplying said output pulses as charging pulses to said capacitance to generate a supply voltage; and,
control means coupled to said charging means and responsive to a second control signal related to said supply voltage, for selectively gating the second of any two successive output pulses as a charging pulse whenever said supply voltage is below a threshold value between leading edges of said any two successive output pulses to control said supply voltage, and said control means comprising:
first means having an output coupled to a control input of said second switch and an input coupled to said output pulses for periodically switching said second switch by said output pulses when said first means is enabled;
a frequency divider operated synchronously with said output pulses; and,
means for enabling said first means in response to one of an output of said frequency divider and said second control signal.

18. A switch mode power supply, comprising:
a source of input voltage;
a transformer including first, second and third windings, said first winding being coupled to said source;
a first controllable switch having a control terminal and two main terminals defining a main current path coupled to said first winding;
a rectifier coupled to said second winding and poled for conducting current during intervals when said first controllable switch is nonconductive, to provide a flyback converter mode of operation for generating a first supply voltage;
a second controllable switch having a control terminal and two main terminals defining a main current path in said second controllable switch that is coupled to said third winding without an intervening rectifying and filtering stage for generating a second supply voltage;
a first control circuit for varying the switching of said first controllable switch to regulate said first supply voltage; and,
second control circuit for synchronously controlling the switching operating of said second controllable switch to the switching operation of said first controllable switch such that said second controllable switch becomes conductive when said first controllable switch becomes nonconductive, said second control circuit being responsive firstly to said second supply voltage for varying the switching frequency of said second controllable switch relative to the switching frequency of said first controllable switch in a manner that regulates said second supply voltage and secondly to a set frequency signal for maintaining a minimum switching frequency of said second controllable switch.

19. A power supply according to claim 18 wherein said first control circuit varies the switching of said first controllable switch in a manner that maintains substantially constant the voltage in the three transformer windings during the off-time of said first controllable switch when said rectifier and said second controllable switch are conducting.

20. A power supply according to claim 19 wherein said second controllable switch comprises a thyristor that is made nonconductive by anode-to-cathode blockage.

21. A switch mode power supply, comprising:
a source of input voltage;
an inductance coupled to said source;
a controllable switch coupled to said inductance and responsive to a first control signal that controls the switching of said controllable switch for generating output pulses in said inductance;
a capacitance for generating a supply voltage responsive to charging pulses; and,
a voltage regulator for said supply voltage, said regulator having:
charging means coupled to said inductance and to said capacitance and responsive to trigger pulses for gating said output pulses to said capacitance as said charging pulses; and, control means coupled to said charging means, responsive to a second control signal related to said supply voltage for selectively generating said trigger pulses, each synchronous with operation of said controllable switch, to gate said charging pulses to said capacitance when necessary to replenish losses sustained by said supply voltage, and responsive to a third control signal for generating at least one of the trigger pulses for a given number of output lines.

22. A switch mode power supply, comprising:

a source of input voltage;

an inductance coupled to said source;

a controllable switch coupled to said inductance and responsive to a first control signal that controls the switching of said controllable switch for generating output pulses in said inductance;

a capacitance for generating a supply voltage responsive to charging pulses; and, a voltage regulator for said supply voltage, said regulator having:

charging means coupled to said inductance and to said capacitance and responsive to trigger pulses for gating said output pulses to said capacitance as said charging pulses;

control means coupled to said charging means, responsive to a second control signal related to said supply voltage for selectively generating said trigger pulses, each synchronous with operation of said controllable switch, to gate said charging pulses to said capacitance when necessary to replenish losses sustained by said supply voltage; and, the number of said trigger pulses varying within a predetermined range having a minimum value of at least one to maintain a minimum operating frequency of said charging means.

23. A switch mode power supply, comprising:

a source of input voltage;

an inductance coupled to said source;

a controllable switch coupled to said inductance and responsive to a first control signal that controls the switching of said controllable switch for generating output pulses in said inductance;

a capacitance for generating a supply voltage responsive to charging pulses;

a voltage regulator for said supply voltage, said regulator having:

charging means coupled to said inductance and to said capacitance and responsive to trigger pulses for gating said output pulses to said capacitance as said charging pulses; and, control means coupled to said charging means, responsive to a second control signal related to said supply voltage for selectively generating said trigger pulses, each synchronous with operation of said controllable switch, to gate said charging pulses to said capacitance when necessary to replenish losses sustained by said supply voltage;

level detecting means for monitoring the supply voltage and generating a first component of said second control signal; and, a frequency divider operated synchronously with said output pulses for generating a second component of said second control signal.

24. A switch mode power supply, comprising:

a source of input voltage;

an inductance coupled to said source;

a controllable switch coupled to said inductance and responsive to a first control signal that controls the switching of said controllable switch for generating output pulses in said inductance;

a capacitance;

charging means coupled to said inductance and to said capacitance for supplying said output pulses as charging pulses to said capacitance to generate a supply voltage; and control means responsive to second and third control signals and coupled to said charging means, firstly for varying the number of charging pulses occurring relative to a given number of output pulses to control said supply voltage in accordance with said second control signal and secondly for supplying at least one charging pulse for each said given number of output pulses in accordance with said third control signal.

25. A power supply according to claim 24, wherein the control means comprises:

level detecting means for monitoring said supply voltage and generating said second control signal; and a frequency divider operated synchronously with said output pulses for generating said third control signal.

26. A power supply according to claim 24, wherein the number of charging pulses varies within a range of integers.

* * * * *

UNITED STATES PATENT AND TRADEMARK OFFICE
CERTIFICATE OF CORRECTION

PATENT NO. : 4,912,617

DATED : March 27, 1990

INVENTOR(S) : Uwe Hartmann et al.

It is certified that error appears in the above-identified patent and that said Letters Patent is hereby corrected as shown below:

Col. 9, line 12, "lines" should read --pulses--.

Signed and Sealed this

Thirty-first Day of December, 1991

Attest:

HARRY F. MANBECK, JR.

*Attesting Officer*  *Commissioner of Patents and Trademarks*